E. B. JACOBSON.
MAGNETO GENERATOR.
APPLICATION FILED MAR. 13, 1915.

1,262,198.

Patented Apr. 9, 1918.
2 SHEETS—SHEET 2.

Witnesses

Inventor
E. B. Jacobson
By
Attorneys

UNITED STATES PATENT OFFICE.

EDWARD B. JACOBSON, OF SPRINGFIELD, MASSACHUSETTS, ASSIGNOR TO HENDEE MANUFACTURING COMPANY, OF SPRINGFIELD, MASSACHUSETTS, A CORPORATION OF MASSACHUSETTS.

MAGNETO-GENERATOR.

1,262,198.　　　　Specification of Letters Patent.　　Patented Apr. 9, 1918.

Application filed March 13, 1915.　Serial No. 14,173.

*To all whom it may concern:*

Be it known that I, EDWARD B. JACOBSON, a citizen of the United States, residing at Springfield, in the county of Hampden, State of Massachusetts, have invented certain new and useful Improvements in Magneto-Generators, of which the following is a description, reference being had to the accompanying drawing and to the figures of reference marked thereon.

The invention relates to new and useful improvements in magneto generators and more particularly to a magneto generator which may be utilized for furnishing an ignition current and also a lighting current.

An object of the invention is to provide a magneto generator of the above character, which shall be simple in construction and wherein the operating parts shall be effectively housed from dust and dirt.

A further object of the invention is to provide a device of the above character, with means for wiping and cleaning the commutator bars of the generator.

A still further object of the invention is to provide a device of the above character with a circuit controlling switch which is located within the space formed in the upper part of the magnets for the generator, and wherein the face plates carry contacts leading to the switch, which contacts are so constructed as to complete the circuit when the face plates are connected to the generator.

These and other objects will in part be obvious and will in part be hereinafter more fully disclosed.

In the drawings which show by way of illustration one embodiment of the invention,—

Fig. 4 is a detail view of the automatic cut-out switch.

Figure 1:
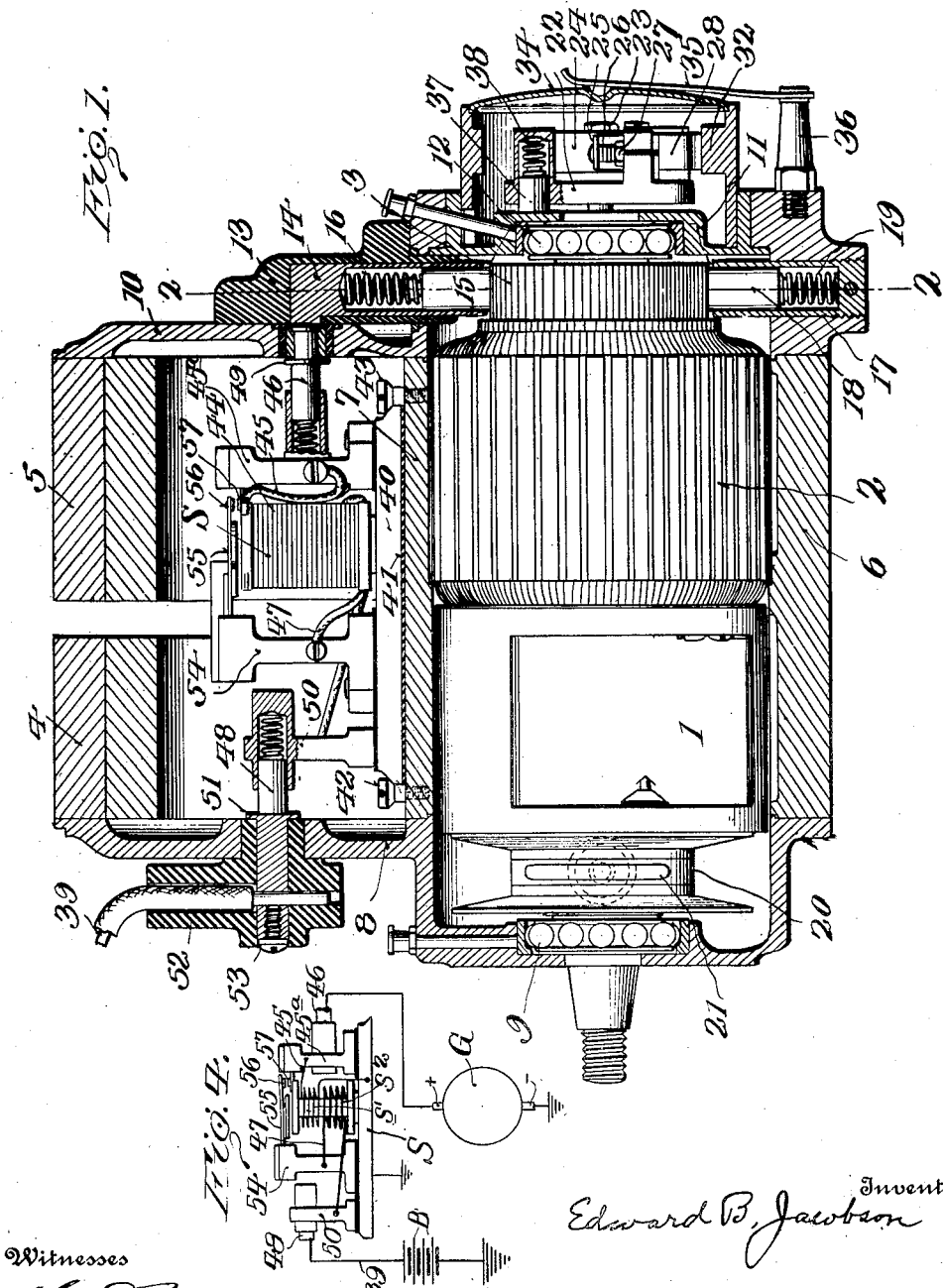
Figure 1 is a longitudinal sectional view through the generator.
Figure 2:
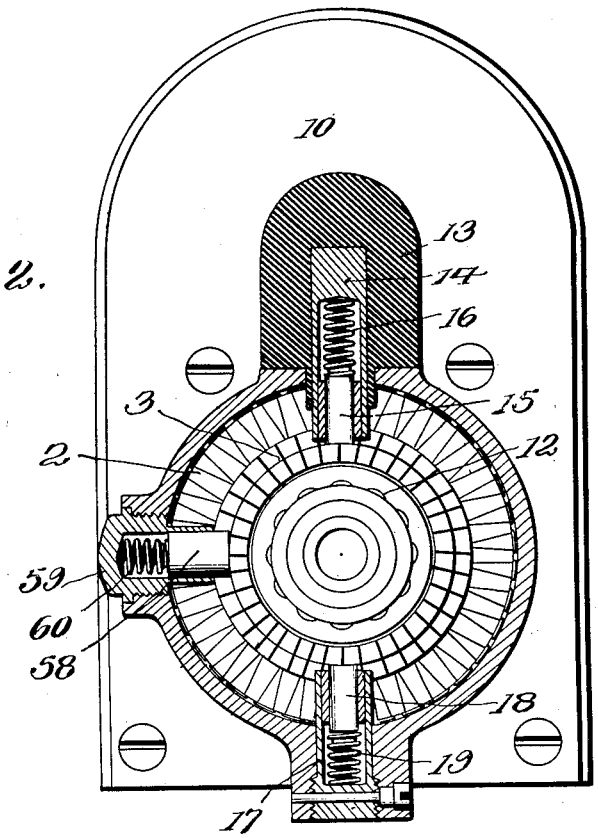
Fig. 2 is a sectional view on the line 2—2 of Fig. 1.
Figure 3:
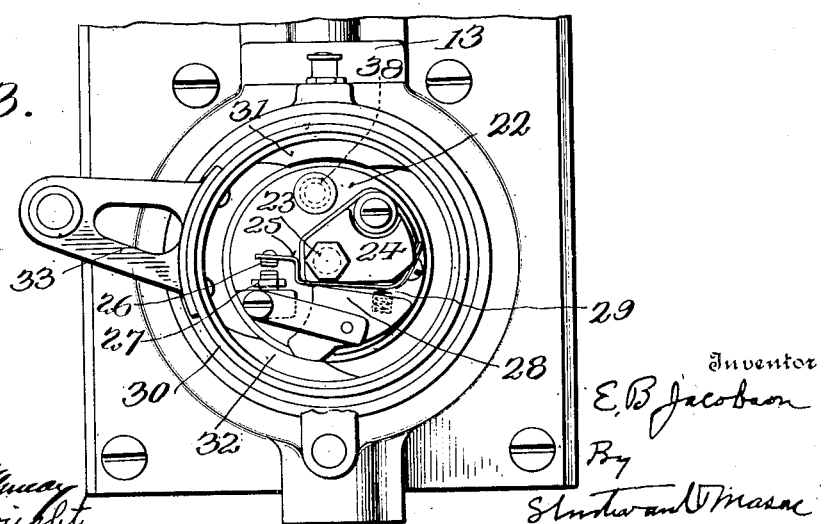
Fig. 3 is an end view of the lower part of the generator, showing the cap plate removed and the circuit interrupter in end elevation.

In carrying out the invention, I have provided a magneto generator having an armature formed in two sections 1 and 2. The section 1 contains a primary coil and a secondary coil, while the section 2 is made up of a series of coils, each of which is connected to a commutator indicated at 3. Field magnets 4 are provided for the primary and secondary coils 1 and field magnets 5 are provided for the coils 2 of the armature. These field magnets are preferably separated from each other and are attached to a base 6 of non-magnetic material. Extending across the magnets above the armature is a partition 7, which is also of non-magnetic material. One side of the generator is closed by a face plate 8, which has a ball bearing 9 for one end of the armature shaft. The other side of the generator is closed by a face plate 10, which is also provided with an auxiliary face plate 11 carrying a ball bearing 12 for the other end of the armature. Mounted on the face plate 10 is a block of insulating material 13, in which is mounted a brush carrier 14, which supports a brush 15 forced by springs 16 against the commutator 3. The lower brush holder 17 is threaded into the face plate and is thus grounded. This brush holder carries a brush 18 which is pressed by a spring 19 against the commutator 3.

At the opposite end of the armature there is a distributer ring 20 having spaced contact plates 21 for connecting the secondary of the armature to first one cylinder and then the other, where two cylinders are used. This commutator plate will, of course, be modified in accordance with the type of engine with which the magneto generator is used.

At the other end of the armature is a circuit interrupter for the primary of the armature. This circuit interrupter comprises a plate 22 which is connected to the armature by a bolt 23. Mounted on the plate 22 is an insulated block 24. The bolt 23 passes through the block 24 and is insulated from the plate 22 and this bolt serves to connect the primary of the armature to the block 24. Mounted on the block 24 is a resilient arm 25 carrying a contact 26. Mounted on the plate 22 is a fixed contact 27. Also mounted on the plate 22 is a pivoted block 28 of non-magnetic material which is normally pressed by a spring 29 against the resilient arm 25. A sleeve 30 is mounted in the auxiliary face plate 11 so as to be capable of adjustment therein and this sleeve, as herein shown, carries two cams 31 and 32. The cams 31 and 32 operate upon the pivoted block 28 and tilt the same so as to cause the block to press the resilient arm for separating the contacts 27 and 28. An arm 33 is attached to the sleeve 30 and the sleeve may be shifted by this arm. The tilting of the sleeve varies the positions of the cams 31 and 32 and thus varies the time of ignition of the cylinders. A cap plate 34 is held pressed against the end of the sleeve by a spring 35 carried by a bracket arm 36 mounted on the face plate 10. The fixed contact 27 is electrically connected with the plate 22 and this plate carries a brush 37 which is pressed by a spring 38 against the auxiliary face plate 11 and thus the fixed contact is grounded through the face plate of the generator.

As the armature rotates, the circuit which is normally closed will be interrupted twice for each complete rotation of the armature through the action of the pivoted block on the stationary cams 31 and 32. These cams, as shown in the drawings, are not directly opposite each other as this generator is particularly adapted for use in connection with a V-type engine where the cylinders are set at an angle to each other.

The direct current taken from the commutator 3 by the positive brush 15 is led through an automatic switch S to a line 39 and may be used for operating lights or for charging a battery, or for other purposes. This automatic cut-out switch comprises a base plate 40 which is mounted on a sheet of insulating material 41 placed on the upper face of the partition 7. The base plate of the switch is held in place by suitable screws 42 and 43.

Said cut-out switch comprises windings or coils 44. The shunt coil indicated at $s'$ has one terminal connected to the base plate 40 and thus to ground, while the other terminal 45 is connected to the standard $45^a$ and through the standard with the terminal 46. The standard 45 is insulated from the base plate 40. The terminal 46 is in the form of a spring pressed plunger which bears against a plate 49 mounted on the face plate 10 and connected to the brush holder 14. The terminal or contact member 48 at the other end of the automatic cut-out is likewise in the form of a spring pressed plunger mounted in a bracket 50 carried by a base plate 40 but insulated therefrom. Said plunger bears against a headed bolt 51 carried by a face plate 8. This headed bolt is mounted in a block 52 of insulating material and the line 39 extends into the block and is clamped to said bolt 51 by a screw 53. Mounted on the base plate 40 is a second bracket 54 which is likewise insulated from the supporting base. This bracket supports an armature 55 carrying a platinum contact point 56. The standard $45^a$ has a rigid projection carrying a platinum point 57.

The windings 44 of the switch also include a second coil $s^2$. One terminal 47 of this coil is connected to the bracket 54 and through this bracket and the armature 55 to the platinum point 56. The other terminal of this coil $s^2$ is connected to the bracket 50 and through the bracket with the spring pressed plunger forming the contact 48. In Fig. 4 of the drawings I have indicated more or less diagrammatically the windings of this automatic switch. The line 39 is connected with the battery D and thence to ground, while the terminal 46 is connected with the positive brush of the generator G.

From above it would be apparent that the platinum points 56 and 57 are normally separated. When the generator is first started the main line between the generator and the battery is broken by the separating of these points. The current from the generator will, however, pass through the shunt coil $s'$ to ground. When the armature reaches a given rate of speed there is sufficient voltage generated to overcome the tension of the spring of the armature of the automatic cut-out and this closes the platinum points 56 and 57 and establishes a circuit from the generator to the battery. When, however, the armature of the generator falls off in speed so that the voltage generated is less than the battery voltage, the reverse current from the battery will flow through the series winding $s^2$ reversing the polarity of the magnet switch and this forces the armature 55 outward, separating the platinum points, and thus disconnecting the battery from the generator.

As a means for maintaining the commutator bars in a clean condition, so as to prevent arcing from one bar to another, I have provided a felt wiping pad 58, which is mounted in a sleeve 59 threaded into the face plate 10, and a spring 60 pressing against the pad forces the same against the commutator bars. As the commutator rotates the bars will be wiped across this felt pad which will tend to keep the same in clean condition.

From the above description, it will be apparent that I have provided a magneto generator which may be utilized for both ignition purposes and for lighting purposes and wherein the armature, the distributer and the controlling coil for the direct current are all housed within the closing face plates for the generator and the circuit interrupter is likewise housed within a sleeve carried by one of the face plates. This makes an extremely simple structure, in which the operating parts will be kept free from dust and dirt, and, therefore, the efficiency of the generator greatly increased.

It is obvious that minor changes in the details of construction and arrangement of parts may be made without departing from the spirit of the invention as set forth in the appended claims.

Having thus described my invention, what I claim as new and desire to secure by Letters Patent, is:

1. A generator including an armature, U-shaped magnets for said armature, a partition of non-magnetic material crossing the space between the arms of the magnet above the armature, an automatic cut-out switch mounted on said partition, face plates for closing the ends of the generator, a yielding contact forming one terminal of the switch, one of said face plates carrying a coöperating contact therefor, a second yielding contact for the other terminal of said switch, a brush carried by the other face plate and coöperating with the armature of the generator, and a contact plate connected with the brush and coöperating with said last named yielding contact.

2. A generator including an armature, U-shaped magnets for said armature, a partition of non-magnetic material crossing the space between the arms of the magnet above the armature, an automatic cut-out switch supported by said partition and including an operating coil, contacts normally separated and controlled by said coil, spring pressed plungers connected with the opposite terminals of said coil, a face plate closing one side of the generator and having a contact member adapted to be engaged by one of said spring pressed plungers, a face plate closing the other side of the generator and having a contact plate adapted to be engaged by the other spring pressed plunger, a brush carried by the last named plate for the armature, said brush being connected to the contact plate in the face plate carrying the brush.

3. A generator including an armature, U-shaped magnets for said armature, a partition of non-magnetic material crossing the space between the arms of the magnet above the armature, an automatic cut-out switch located above said partition and in the space between the arms of the magnets, face plates for closing the ends of the generator, a supporting base for said switch, and screws at the ends of the supporting base for engaging and detachably holding said cut-out switch on said partition.

In witness whereof I affix my signature in the presence of two witnesses.

EDWARD B. JACOBSON.

Witnesses:
JOHN D. STEPHENS,
P. J. KELLY.